United States Patent Office 3,681,009
Patented Aug. 1, 1972

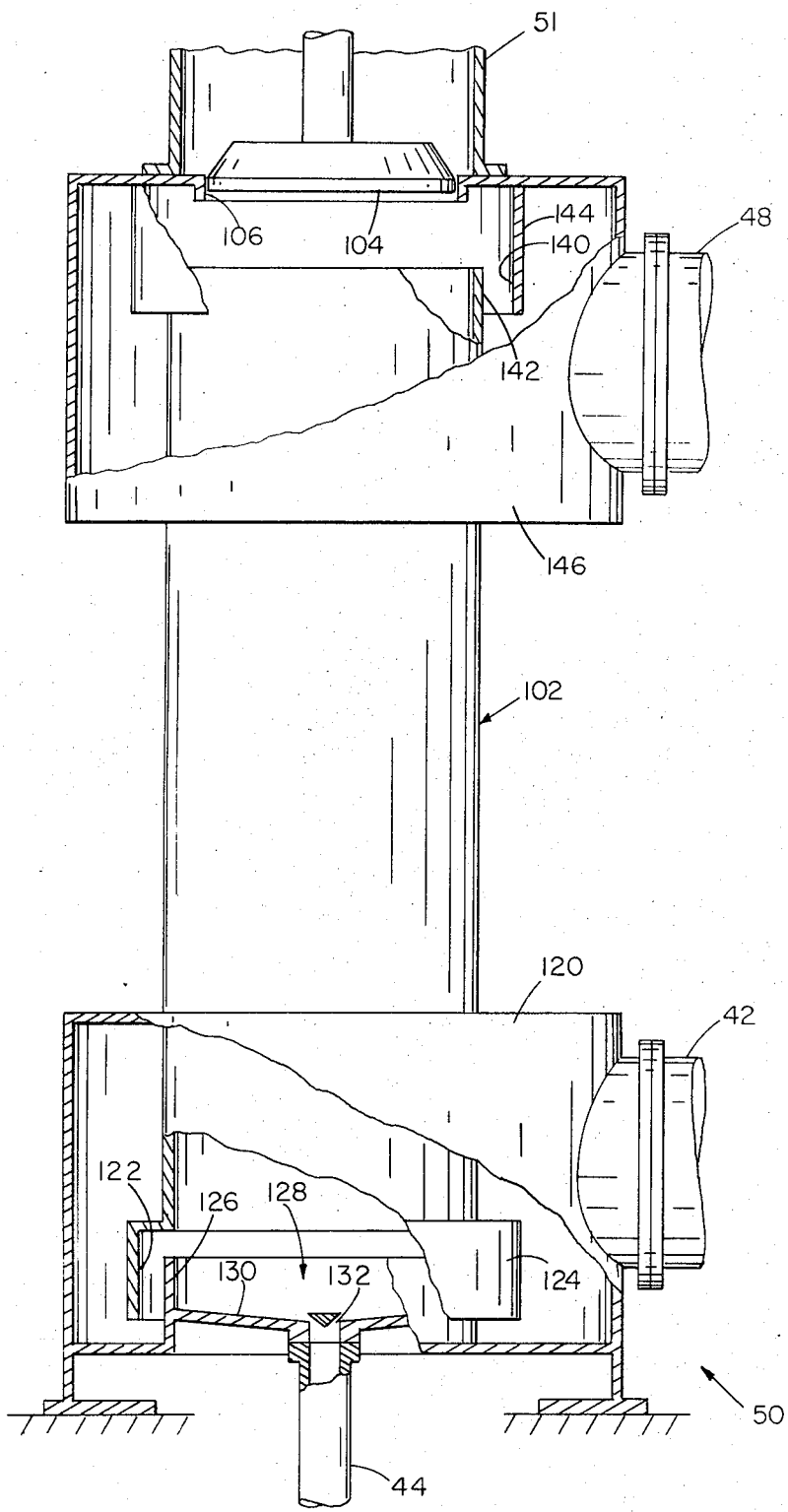

3,681,009
METHOD AND APPARATUS FOR REMOVING MATERIAL FROM GAS
Caperton B. Horsley, East Walpole, Mass., assignor to Braxton Corporation, Medfield, Mass.
Filed Dec. 10, 1969, Ser. No. 883,782
Int. Cl. B01d 47/00
U.S. Cl. 23—2 R                                     17 Claims

ABSTRACT OF THE DISCLOSURE

Treating gas to remove unwanted particles suspended therein by first introducing and dispersing secondary particles into the gas, then exposing the gas to a sonic field which induces differential motion between suspended particles of different sizes whereby the particles are caused to collide with each other and agglomerate into composite particles, and then removing the composite particles from the gas.

---

This invention relates to removing material from a gas. It is a primary object of the invention to remove particles suspended in a gas stream. Other objects are to remove an unwanted gaseous constituent and particles less than 1 micron diameter from a gas stream.

The invention features treating gas to remove unwanted particles suspended therein by first introducing and dispersing secondary particles into the gas, then exposing the gas to a sonic field which induces differential motion between suspended particles of different sizes whereby the particles are caused to collide with each other and agglomerate into composite particles, and then removing the composite particles from the gas.

Preferred embodiments feature the concurrent removal of sulfur dioxide and sub-micron particles, exposure of the gas to a sonic field within a resonant chamber supplied with energy by a reciprocating wall and fitted with a gravity-fed catch basin, a particle injector comprising a sprayer saturating the gas with water followed by a turbine for expanding and producing condensation in the gas, forming the secondary particles of ammonia solution which reacts with the sulfur dioxide, a compressor to increase the pressure of the gas while drawing power from the turbine, and a cyclone separator for removal of residual particles.

Other objects, features, and advantages will appear from the following description of a preferred embodiment of the invention taken together with the attached drawings thereof wherein:

FIG. 2 is a partially cutaway view of an agglomeration chamber.

Figure 1:
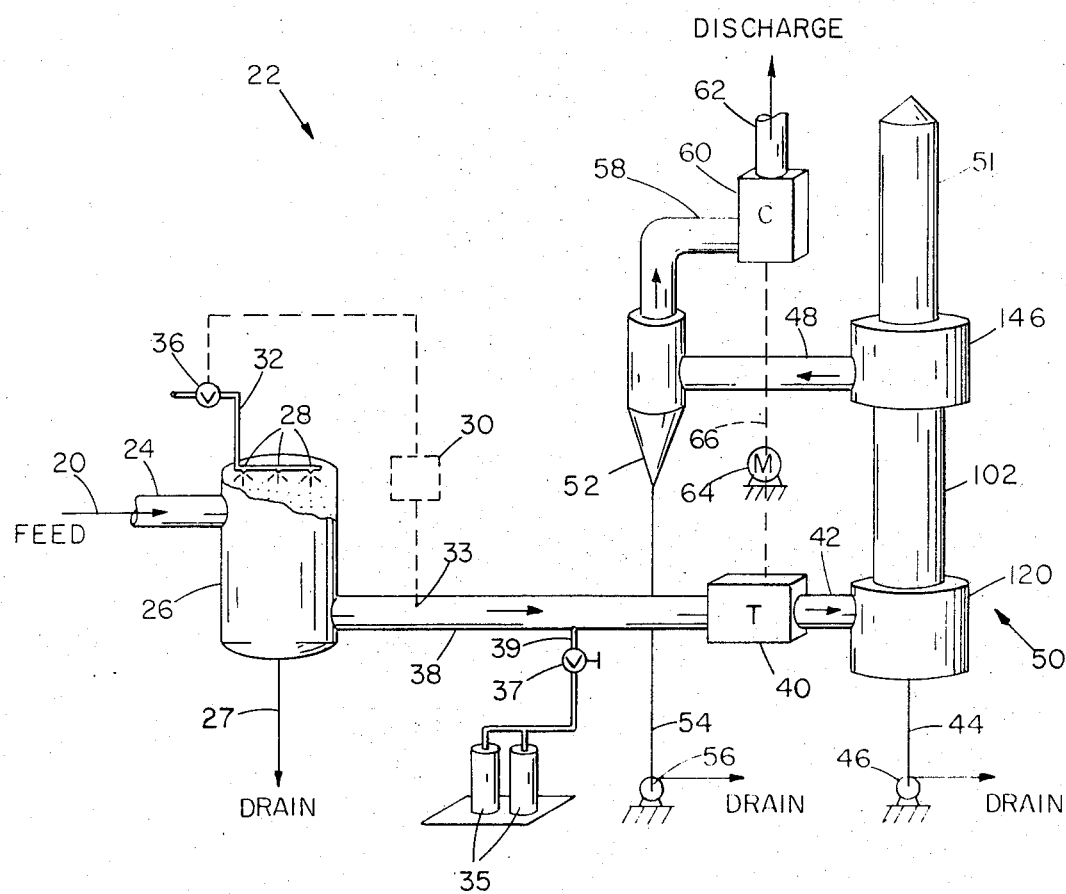
FIG. 1 is a diagrammatic layout of the apparatus for removing particles.

As shown in the drawings, feed stream 20 bearing unwanted particles and gases, such as fly ash and sulfur dioxide, enters the treating apparatus 22 through inlet conduit 24 which discharges the untreated gas into saturator chamber 26 provided at its top with sprayers 28.

Water is supplied to sprayers 28 through automatic control valve 36 and supply pipe 32. Drain pipe 27 at the bottom of chamber 26 provides for the discharge of excess water. Chamber 26 discharges into conduit 38 where sensors 33 (of conventional design) sense the temperature and humidity of the gas flowing in conduit 38 and provide information input to controller 30 of conventional design controlling automatic valve 36. Ammonia supply 35 discharges a flow of ammonia gas through valve 37 and line 39 into conduit 38.

Conduit 38 leads into expansion turbine 40, and conduit 42 connects the output of turbine 40 to the input of sonic agglomeration chamber 50 (described more particularly below) with sonic stimulator 51 attached. Chamber 50 is provided with drainage pipe 44 discharging through pump 46. Conduit 48 connects from chamber 50 to cyclone separator 52 having drainage pipe 54 discharging through pump 56. Conduit 58 connects separator 52 to compressor 60. Discharge conduit 62 is connected from the output of compressor 60. Compressor 60 and turbine 40 are coupled to each other and to motor 64 (in the preferred embodiment by a common shaft 66 shown only schematically).

Agglomeration chamber 50 more particularly shown in FIG. 2 has a central cylindrical sonic resonant chamber 102 the upper wall 104 of which is adapted to reciprocate at a determined stimulation frequency (about 400 Hz. in the preferred embodiment) in a direction normal to its surface within circular orifice 106. Means are provided for supporting and moving wall 104 such as those described in my co-pending application No. 854,373 (filed Sept. 2, 1969). Inlet manifold 120 encircles the lower portion of chamber 102 and communicates with conduit 42. Catch basin 128 is situated at the bottom of chamber 102 and has a floor 130 sloping downwards to drain port 132 communicating with drain pipe 44. Annular inlet channel 122 lying between cover 124 and wall 126 of catch basin 128 provides communication between manifold 120 and chamber 102.

Annular outlet channel 140 lying between wall 142 of chamber 102 and outlet cover 144 provides communication between the upper portion of chamber 102 and outlet manifold 146, encircling chamber 102. Manifold 146 in turn communicates with conduit 48. Channels 122 and 144 are sized to be ¼ wavelength of the sonic field and are situated to communicate with chamber 102 at regions of minimum pressure variation in the sonic field produced in chamber 102 thereby minimizing the transmission of sonic power through these channels.

In operation, a feed stream 20 containing unwanted particles such as fly ash in suspension as well as an unwanted gaseous constituent such as sulfur dioxide enters the treatment apparatus through conduit 24 and is discharged into saturator chamber 26. Sprayers 28 at the top of saturator chamber 26 are supplied with water under pressure and produce a spray of water drops which drift downward through chamber 26, evaporating into and cooling the gas. Normally the flow of water to the sprayers is controlled at a rate such that nearly all the water discharged is evaporated into the gas stream. If, however, the feed gas enters at abnormally high temperatures, the water flow is increased to cool the gas discharged from the saturator. Excess water collects on the bottom of chamber 26 and drains away through drainpipe 27. The gas stream, now saturated with water vapor, discharges from chamber 26 into conduit 38. The temperature and relative humidity of the gas discharged into conduit 38 are sensed by sensors 32 which, operating through controller 30 and control valve 36, regulate the flow of water to sprayers 28. Ammonia gas is discharged into conduit 38 which it mixes with the water-saturated process gas. The gas stream, now saturated with water vapor and admixed with ammonia, discharges from conduit 38 into turbine 40 where it undergoes an approximately adiabatic expansion reducing both its pressure and temperature. As a result of its expansion in turbine 40, the gas stream becomes supersaturated with respect to water vapor, and secondary particles of liquid water are introduced and dispersed by condensation throughout the body of the gas. The ammonia gas carried in the stream dissolves in the water particles producing a reactive solution of ammonia. The outflow, carrying the drops of ammonia solution in suspension, is conveyed through conduit 42 to the inlet manifold 120 of sonic agglomertaion chamber 50 and from inlet manifold 120 enters sonic resonant chamber 102 through inlet channel 122.

Wall 104 at the top of sonic resonant chamber 102 is driven in reciprocating motion at a determined frequency (e.g. 400 Hz.) by stimulator 51 as described in my co-pending application No. 854,373 (filed Sept. 2, 1969). Since the length of chamber 102 is chosen to be resonant at the frequency of motion of wall 104, a standing wave sonic field is produced within chamber 102 by the motion of wall 104. This field has sufficient amplitude to produce displacements (e.g. 3 mm.) larger than the diameter of suspended drops. The reciprocating motion of the gas excited by the sonic field tends to move particles suspended in the gas in a corresponding motion. The smaller particles (less than 1 micron diameter), having little inertia, move almost exactly with the gas wherein they are suspended. The larger particles (greater than 10 microns diameter), however, because of their greater inertia, are not so readily moved by the gas and reciprocate with an amplitude substantially less than that of the gas wherein they are suspended. The result is that a differential reciprocating motion is produced with the smaller particles and the gas moving through a large amplitude and the larger particles moving less or (if they are very large) not at all in the sonic field. The differential motion described promotes collisions between the larger and smaller particles, agglomerating them into larger composite particles. The differential motion between the larger particles and the gas produces an augmented exposure of gas to the surface of the larger drops thereby promoting a rapid and thorough absorption of the sulfur dioxide constituent into these particles where it is neutralized by reaction with the dissolved ammonia. The agglomeration of particles of different sizes by successive collisions produces composite particles so large they are not held in suspension, and these composite particles, impelled by gravity, fall to the bottom of chamber 102 where they are collected in catch basin 128 and drawn off through drain pipe 44 and pump 46. After treatment in agglomeration chamber 102, the gas flows out through channel 140 and outlet manifold 146 to conduit 48.

In order to obtain a thorough removal of unwanted particles, it is important to introduce a sufficient number of secondary particles so that, taking into consideration the characteristics of the sonic field (such as frequency and amplitude) and the duration of exposure to the sonic field, particles will have a high probability of collision and agglomeration into composite particles.

From conduit 46 the gas passes to cyclone separator 52 where any residual particles that did not fall into catch basin 128 are removed and drained away through drain 54 and pump 56. The gas now cleansed of its fly ash and sulfur dioxide passes to compressor 60 where it is compressed to ambient pressure and then discharged through outlet conduit 62. The compression occurring in compressor 60 increases the temperature of the gas and reduces its relative humidity so that it is less likely to form a steam plume when discharged into cool air.

Turbine 40 and compressor 60 operate on a common shaft 66 so that the work extracted from the gas during expansion in the turbine can be applied to compress the gas in the compressor. Motor 64 also on shaft 66 provides additional power to operate the compressor since the turbine usually supplies less power than the compressor requires.

Typical operating conditions for a preferred embodiment are as follows:

Feed stream—Flow: 20,000 c.f.m.; Temperature: 400° F.; Composition: 0.25% $SO_2$, 0.1 gr./ft.$^3$ fly ash with particle diameter in range 0.1–1.0 micron.

Stream at turbine entrance—Flow: 14,000 c.f.m.; Temperature 150° F.; Pressure 14.7 p.s.i.a.; Relative humidity: 100%; Ammonia content: 0.05%.

Stream entering sonic chamber—Pressure: 13.7 p.s.i.a.; Temperature: 146° F.; Liquid water content: 1.0 gr./ft.$^3$ In sonic chamber—Sonic frequency: 400 Hz.; Sonic intensity: ±1.3 p.s.i. (peak); Exposure time: 1.6 sec.

Stream at exit from system—$SO_2$ content: 0.013%; Particle content: less than 0.01 gr./ft.$^3$

I claim:

1. The process for treating a gas to remove unwanted particles suspended therein comprising first introducing and dispersing secondary particles into said gas, said introduced particles being produced by first saturating said gas with a vapor and then expanding approximately at constant entropy said gas to cause formation of said introduced particles by condensation of said vapor; then exposing said gas to a sonic field which induces reciprocating differential motion between exposed suspended particial of different sizes, said motion having amplitude larger than the diameter of the smallest of said exposed particles, whereby said exposed particles are caused to collide with each other and agglomerate into composite particles; and then removing said composite particles from said gas.

2. The process of claim 1 including the further step of compressing said gas after said composite particles are removed to discharge said gas in an unsaturated condition.

3. The process of claim 1 wherein said gas contains also an unwanted gaseous constituent mixed therein and wherein said introduced particles are composed of a material which reacts with said unwanted gaseous constituent so that said unwanted gaseous constituent is incorporated in said composite particles and removed therewith.

4. The process of claim 1 in which said sonic field has a frequency between 300 and 500 Hz. and pressure variations in excess of 0.5 p.s.i. (peak).

5. The process of claim 4 in which said secondary particles have diameters predominantly in the range 1–100 microns.

6. The process of claim 5 in which the mass of said secondary particles added is greater than that of said unwanted particles.

7. Apparatus for treating a stream of gas to remove unwanted particles suspended therein comprising in combination a saturator chamber connected to receive said gas in an untreated condition including means for spraying water into said gas thereby saturating it with water vapor; an expansion turbine connected to receive effluent from said saturator chamber and adapted to effect an approximately isentropic expansion of said gas whereby condensation of liquid water drops is brought about; sonic agglomeration chamber connected to receive effluent from said turbine, proportioned to be resonant to a sonic driving frequency, and including means to expose particles suspended in said gas to a sonic field with pressure excursions in excess of 1 p.s.i., said sonic field inducing differential motion and collisions between particles of different sizes whereby agglomeration of said exposed particles is brought about; a catch basin connected at the bottom of said sonic chamber; and a compressor connected to receive effluent from said sonic chamber and adapted to draw energy from said turbine and compress said gas to atmospheric pressure.

8. Apparatus for treating a stream of gas to remove unwanted particles suspended therein comprising:
   a saturator connected to receive said gas in untreated condition and including means to introduce and disperse vapor through said gas, said saturator being connected to a turbine expansion device connected for passage of said gas therethrough wherein said gas is expanded to produce condensation particles,
   a sonic agglomeration chamber connected to said turbine to receive the outflow from said turbine and including means to expose said gas to a sonic field which induces reciprocating differential motion between exposed suspended particles of different sizes, said motion having amplitude larger than the diameter of the smallest of said exposed particles, whereby said exposed particles are caused to collide with each other and agglomerate into composite particles, and removal equipment connected to said agglomeration chamber and including means to remove said composite particles from said stream.

9. The apparatus of claim 8 in which said chamber has a wall which reciprocates at a predetermined frequency and thereby supplies energy to said sonic field.

10. The apparatus of claim 9 in which said sonic chamber is proportioned to be resonant at said frequency.

11. The apparatus of claim 10 in which said removal equipment includes a gravity-fed basin within said sonic chamber.

12. The apparatus of claim 8 in which said gas has also an unwanted gaseous constituent and in which said secondary particles are composed of a material which reacts with said unwanted gaseous constituent so that said unwanted gaseous constituent is incorporated in said composite particles and removed therewith.

13. The apparatus of claim 12 in which said reactive material is dilute ammonia solution and said unwanted gaseous constituent is sulfur dioxide.

14. The apparatus of claim 8 wherein said dispersing means saturates said gas with vapor.

15. The apparatus of claim 14 including also a compressor connected to removal apparatus for flow of said gas therethrough and coupled to draw power from said turbine.

16. The apparatus of claim 15 in which said compressor is connected downstream from said removal equipment.

17. The apparatus of claim 14 in which said vapor is water vapor.

References Cited

UNITED STATES PATENTS

| | | | |
|---|---|---|---|
| 2,215,484 | 9/1940 | St. Clair | 55—15 |
| 2,216,779 | 10/1940 | Houghton et al. | 55—15 |
| 2,535,700 | 12/1950 | Seavey et al. | 55—15 |
| 2,675,883 | 4/1954 | Deanesly | 55—57 |
| 2,858,903 | 11/1958 | Goetz et al. | 55—85 |
| 3,109,721 | 11/1963 | Zenner et al. | 55—15 |
| 3,248,855 | 5/1966 | Hartmann | 55—68 |
| 3,406,498 | 10/1968 | Wisting | 55—257 |
| 3,494,099 | 2/1970 | Ens et al. | 55—15 |
| 3,495,384 | 2/1970 | Alliser | 55—277 |
| 3,518,812 | 7/1970 | Kolm | 55—89 |
| 2,720,939 | 10/1955 | Stokes | 55—15 |
| 2,424,375 | 7/1947 | Van Allen | 55—15 |

FOREIGN PATENTS

| | | | |
|---|---|---|---|
| 711,286 | 6/1954 | Great Britain | 55—15 |
| 651,356 | 3/1951 | Great Britain | 55—277 |

BERNARD NOZICK, Primary Examiner

U.S. Cl. X.R.

23—260, 284; 55—15, 277; 116—137 A